(12) United States Patent
Aslaksen (10) Patent No.: US 10,376,111 B2
(45) Date of Patent: Aug. 13, 2019

(54) INCINERATION TOILET

(71) Applicant: Sirius Technology AS, Midsund (NO)

(72) Inventor: Odd Arne Aslaksen, Furuflaten (NO)

(73) Assignee: Sirius Technology AS, Midsund (NO)

( * ) Notice: Subject to any disclaimer, the term of this patent is extended or adjusted under 35 U.S.C. 154(b) by 0 days.

(21) Appl. No.: 14/425,230

(22) PCT Filed: Sep. 6, 2013

(86) PCT No.: PCT/NO2013/050155
§ 371 (c)(1),
(2) Date: Mar. 2, 2015

(87) PCT Pub. No.: WO2014/038957
PCT Pub. Date: Mar. 13, 2014

(65) Prior Publication Data
US 2015/0208883 A1      Jul. 30, 2015

(30) Foreign Application Priority Data

Sep. 6, 2012   (NO) .................................. 20121008

(51) Int. Cl.
*A47K 11/02*        (2006.01)
(52) U.S. Cl.
CPC ........... *A47K 11/023* (2013.01); *Y02A 50/454* (2018.01)
(58) Field of Classification Search
CPC ...... A47K 11/02; A47K 11/023; Y02A 50/454
(Continued)

(56) References Cited

U.S. PATENT DOCUMENTS

| 181,397 A | * | 8/1876 | Beyron | .................. A47K 11/04 |
| | | | | 297/328 |
| 1,017,675 A | * | 2/1912 | King | .................... A47K 13/247 |
| | | | | 4/476 |

(Continued)

FOREIGN PATENT DOCUMENTS

| EP | 0609614 A1 | 8/1994 |
| FR | 2383640 A1 | 10/1978 |

(Continued)

OTHER PUBLICATIONS

International Search Report in International Application No. PCT/NO2013/050155 dated Jan. 30, 2014.

(Continued)

*Primary Examiner* — Erin Deery
(74) *Attorney, Agent, or Firm* — Oppedahl Patent Law Firm LLC (57) ABSTRACT

It is described an incineration toilet especially suitable for caravans and camping cars. The toilet comprises a toilet chair with a pouch bowl (3). In the pouch bowl (3), a waste pouch can be arranged. Below the pouch bowl, there is a hatch mechanism over a combustion chamber (4). The hatch mechanism comprises a spring-loaded flap (21) in the back part of the pouch bowl, as well as a hatch (11) abutting an opening in the upper part of the combustion chamber (4). The hatch (11) is coupled to a motor (13) via a stay transmission (14, 15). The motor is arranged to lift the hatch (11) and revolve it up behind the flap (21), so that the flap is released and the pouch can fall down into the combustion chamber (4).

17 Claims, 8 Drawing Sheets

(58) Field of Classification Search
USPC ...... 4/111.1–111.6, 465, 479, 460, 476, 478; 297/328
See application file for complete search history.

(56) References Cited

U.S. PATENT DOCUMENTS

| | | | | |
|---|---|---|---|---|
| 1,050,435 | A * | 1/1913 | Eastman | A47K 11/02 4/477 |
| 1,052,315 | A * | 2/1913 | Chickanceff | A47K 11/023 4/111.4 |
| 1,298,658 | A * | 4/1919 | Button | A47K 11/02 4/477 |
| 2,658,201 | A * | 11/1953 | Yorke | A47K 17/00 4/300 |
| 2,749,968 | A * | 6/1956 | Suser | A47K 13/00 312/228 |
| 2,858,778 | A | 11/1958 | Gleasman | |
| 3,020,559 | A | 2/1962 | Blankenship et al. | |
| 3,068,812 | A * | 12/1962 | Hemeon | F23G 5/10 110/190 |
| 3,133,291 | A | 5/1964 | Anderson et al | |
| 3,139,626 | A | 7/1964 | Blankenship | |
| 3,230,913 | A | 1/1966 | La Mere | |
| 3,827,378 | A * | 8/1974 | Kufrin | F23G 5/50 4/111.3 |
| 3,890,653 | A | 6/1975 | Blankenship | |
| 3,959,829 | A * | 6/1976 | Nordgren | A47K 11/02 4/111.2 |
| 4,051,561 | A * | 10/1977 | Frankel | A47K 11/023 4/111.3 |
| 4,161,793 | A * | 7/1979 | Merchan | A47K 10/38 4/449 |
| 4,425,671 | A * | 1/1984 | Nelken | A47K 11/02 4/111.3 |
| 5,337,422 | A * | 8/1994 | Blankenship | A47K 11/023 4/111.5 |
| 5,581,824 | A * | 12/1996 | Crook, Sr. | A47K 13/242 4/253 |
| 6,052,836 | A * | 4/2000 | Pedersen | A47K 11/023 4/111.1 |
| 6,108,827 | A * | 8/2000 | Espadas | A47K 13/242 4/253 |
| 2010/0219668 | A1* | 9/2010 | Nelson | A61G 5/14 297/330 |
| 2013/0031707 | A1* | 2/2013 | Takizawa | A47K 11/023 4/111.5 |

FOREIGN PATENT DOCUMENTS

| | | |
|---|---|---|
| GB | 2112038 A | 7/1983 |
| JP | H05-95394 U | 12/1993 |
| WO | 94/06338 A1 | 3/1994 |
| WO | 98/02079 A1 | 1/1998 |
| WO | 2006/079906 A2 | 8/2006 |
| WO | WO 2011132449 A1 * | 10/2011 ........... A47K 11/023 |

OTHER PUBLICATIONS

Written Opinion of the International Searching Authority in International Application No. PCT/NO2013/050155 dated Jan. 30, 2014.
International Preliminary Report on Patentability in International Application No. PCT/NO2013/050155 dated Nov. 26, 2014.
Norwegian Search Report in Norwegian Application No. 20121008 dated Apr. 4, 2013.

* cited by examiner

INCINERATION TOILET

SCOPE OF THE INVENTION

The present invention relates to an incineration toilet, and more specifically to a toilet especially designed for used in conditions where there is a limited space, such as caravans, camping cars and boats.

BACKGROUND

At the present, there are numerous toilets in the marked based on incineration of waste by means of electricity or gas.

Due to the high temperature in the combustion chamber, such toilets often have a large outer casing in order to insulate towards the surroundings. Furthermore, does the toilets often contain complicated mechanisms around the combustion chamber, both due to security reasons, and to provide good access for emptying and maintenance. These mechanisms demand space and are exposed to failure. This applies particularly to systems with sliding rails, which easily get stuck.

SUMMARY OF THE INVENTION

It is a purpose of the present invention to provide an incinerating toilet which demands a smaller functional space while at the same time giving the same user qualities as existing toilets. Furthermore, the toilet must be safe and preferably demand less maintenance than existing toilets.

These purposes are aimed to be solved by the present invention.

The present invention relates to an incineration toilet comprising a toilet pedestal and an outer toilet casing, where a framework and a pouch bowl for holding a waste pouch are arranged in the toilet pedestal. The pouch bowl is in communication with a combustion chamber via a hatch mechanism. The toilet also comprises a heat source for supply of heat to the combustion chamber and an exhaust fan for drawing out exhaust gases from the combustion chamber. The hatch mechanism comprises a flap forming a part of the pouch bowl, as the flap is suspended in a spring-loaded hinge, and a hatch being arranged to cover an opening of the combustion chamber, where the hatch is coupled to a motor and being openable by the motor, as the flap is arranged to be revolvable upwards and behind the flap, thereby being able to release the flap, so that the waste pouch can fall down into the combustion chamber. The toilet casing of the present incineration toilet is slidably connected to sliding rails and being rotatable and slidable upwards and away from the toilet pedestal by means of the sliding rails, thereby providing access to waste handling parts of the toilet.

After a certain time of use of an incineration toilet, the combusted waste in the form of ash must be removed from the combustion chamber, normally in some sort of ash tray. In prior art toilets a door, lid or the like is provided in the casing to allow access to the combustion chamber or ash tray. When ash is to be removed from the toilet, the door is open, and the ash tray is pulled out, emptied and replaced in the toilet. However, such doors, lids etc. presents a weakening of the toilet casing. As the toilet casing must hold the weight of the user, the casing is rather large and solid to compensate for this weakening.

The toilet of the present invention is intended for use in situations where there is a limited space, such as in caravans, camping cars, boats or the like. Therefore, it is a desire to reduce the size of the toilet casing, while at the same time remaining at least the same strength as prior art toilet casings. Thereby, the complete outer casing of the toilet according to the invention is shiftable and moveable to provide access to the inner parts of the toilet, such as the combustion chamber and the ash tray. The outer casing of the toilet according to the invention is lifted and tilted upwards and away from the centre of the toilet, thereby provide access to the combustion chamber or ash tray under the casing. As there are no weakening cuttings or openings in the outer casing, it can obtain a smaller and/or slimmer design, while at the same time maintaining a sufficient strength to hold the weight of the user.

In one aspect of the invention, the outer casing of the incineration toilet is suspended in a pair of sliding rails, the sliding rails being arranged on opposing sides of the toilet pedestal and being provided with locking means at the upper end and/or the lower end of the sliding rails. As the movement of the outer casing is conducted by means of sliding rails, it is easy to control the movement of the casing to avoid damage on parts of the toilet in that it is ensured that the movement of the casing is not in conflict with inner parts or the toilet. The sliding rails will also enable the adequate lifting movement without much effort, making it possible to handle the casing even for user with limited strength.

In one aspect of the invention, the upper locking means of the sliding rails are indentations being provided in the rails. The lower locking means can be a mainly vertically arranged section of the sliding rail. It is advantageous if a bolt is arranged in each of the lower back corners of the casing in slidable connection with the sliding rail, so that the bolt can be lockable by means of the indentations in the rail, thereby leaving the outer casing in an open and tilted position.

In the lower position, the casing is locked in position by means of the bolt being coupled to the outer casing and being partly situated in a lower substantially vertical section of the sliding rail. Thereby, the casing is prevented by movement, as the weight of the casing prevents it from lifting and the substantially vertical rail section prevents the casing from shifting forwards and backwards. As the casing fits rather tightly around the toilet frame, it is also prevented from other sideways shifting.

The indentations in the upper section of the sliding rails, provide an easy locking means being both cost efficient to provide and making it easy to lock and release the bolts by the user.

It is an advantage if the incineration toilet, comprised a support strap being connected at a first end to an upper section of the toilet frame and at a second end to an upper and inner section of the toilet casing, adjacent to the back side of the toilet. When the casing is lifted and tilted upwards and away from the combustion chamber, the support strap holds the upper part of the toilet casing, to prevent the casing from falling out or rotating away in an uncontrolled manner. It is an advantage if the strap is releasably connected at least one of the first and second ends, the enable a complete removal of the toilet casing when a complete access to the inside of the toilet is needed.

In one aspect of the invention, the hatch covering the opening of the combustion chamber is suspended in a fork which is rotatable around a shaft, the fork being coupled to the motor via a stay transmission. The movement of the hatch can be controlled by means of an auxiliary lever. The hatch covering the opening of the combustion chamber plays an important part in the waste handling process, and it is a great advantage that these parts does not get wedged. As they are presenting rotating or revolving movements not being dependent on sliding rails, it is presented a more reliable solution than prior art systems, where the likelihood of parts being wedged is diminished.

In one aspect of the invention, the incineration toilet comprises a catalyzer being arranged between the combustion chamber and the exhaust fan, and the heat source of the toilet comprises a gas burner being arranged to send a main beam of burning gas towards the waste in the combustion chamber, and a supplemental beam directed towards the catalyzer.

A catalyzer normally needs to have a certain temperature to function, such as approx. 350° C. and functions optimally above temperatures of approx. 450° C. The supplemental beam will heat the catalyzer to ensure that it reaches a sufficient temperature quickly to allow it to process all exhaust gases exiting the combustion chamber.

In one aspect of the invention, the incineration toilet further comprises an air-providing channel leading from outside of the toilet room in which the toilet is placed, and into the toilet casing. Furthermore, the exhaust fan is designed to pull air from both the combustion chamber and the inside of the casing. The air providing channel draws in air from an area outside the toilet room, in which the toilet is placed, such as from outside the caravan, mobile car or boat. The inlet of the air-providing channel can be arranged in the floor of a caravan or mobile car under the toilet. However, it is also conceivable to arrange the inlet in a wall, as the intention of the inlet is to provide combustion air from the outer environment where there is an unlimited access to fresh air, to avoid using the indoor air of the caravan, boat or the like, where there is a more limited space and thereby more limited amount of air.

In one aspect of the invention, the combustion chamber comprises an ash tray forming a lower closing of the combustion chamber, where the ash tray, or the combustion chamber and ash tray, is tilting. The ash tray, or ash tray and combustion chamber, is advantageously tilted so that the bottom of the ash tray is turned towards the back side of the toilet. If an incineration toilet is frequently used, it is likely that some of the waste is discharged before former waste is completely combusted. When waste is discharged into an inclined combustion chamber, it will slide or move downwards and away from the pouch bowl, leaving more room for the waste of a new user, if the toilet is used again before the former waste is burned to ash.

Thereby, the invention also relates to an incineration toilet comprising a toilet pedestal, the toilet further comprising an outer toilet casing, a framework and a pouch bowl for holding a waste pouch arranged in the toilet pedestal, the pouch bowl being in communication with a combustion chamber via a hatch mechanism, the toilet also comprising a heat source for supply of heat to the combustion chamber, an exhaust fan for drawing out exhaust gases from the combustion chamber, the hatch mechanism comprising a flap forming a part of the pouch bow, as the flap is suspended in a spring-loaded hinge, and a hatch arranged to cover an opening of the combustion chamber, where the hatch is coupled to a motor and being openable by the motor, as it the flap is arranged to be revolvable upwards and behind the flap, thereby being able to release the flap, so that the waste pouch can fall down into the combustion chamber, the combustion chamber comprising an ash tray (23) forming a lower bottom or base of the combustion chamber, as the ash tray, or combustion chamber and ash tray, is tilting.

As waste is enabled to move away from the discharge area of the combustion chamber, the likelihood of waste "piling up" below the discharge area is smaller and it is conceivable to treat a larger amount of waste or reduce the size of the combustion chamber without compromising with the capacity of the toilet. Furthermore, if the combustion chamber is tilted, the foot print of the chamber on the floor is smaller, making it possible to slim down the outer casing of the toilet, which is desirable for users with limited space.

The toilet casing of the above mentioned incineration toilet can advantageously be slidably connected to sliding rails and rotatable and slidable upwards and away from the toilet pedestal by means of the sliding rails. The outer casing can be suspended in a pair of sliding rails, the sliding rails being arranged on opposing sides of the toilet pedestal and being provided with locking means at the upper end and/or the lower end of the sliding rails. A bolt is advantageously arranged in each of the lower back corners of the casing being in slidable connection with each sliding rail, the bolts being lockable by means of the indentations in the rails, thereby leaving the outer casing in an open and tilted position. It is an advantage if a support strap is provided in the toilet, the strap being connected at a first end to an upper section of the toilet frame and at a second end to an upper and inner section of the toilet casing, adjacent to the back side of the toilet. At least one of the ends of the strap should be releasably connected to the toilet.

The bolt and sliding rail system of the toilet, provides access to the inner parts of the toilet while at the same time leaving the casing whole and without cuttings or holes. This makes it possible to diminish the size of the casing, while maintaining at least the same strength as prior art incineration toilets.

In the above mentioned toilet, the hatch can be suspended in a fork which is rotatable around a shaft and the fork can be coupled to the motor via a stay transmission. The toilet can also comprise an auxiliary lever controlling the movement of the hatch. This construction of the hatch assembly provides a reliable solution.

The above mentioned toilet can also comprise a catalyzer being arranged between the combustion chamber and the exhaust fan, and the heat source can comprise a gas burner being arranged to send a main beam of burning gas towards the waste in the combustion chamber, and a supplemental beam directed towards the catalyzer. The supplemental beam ensures an efficient heating of the catalyzer to ensure a good handling of all exhaust gasses exiting the combustion chamber.

The toilet can also comprise an air providing channel leading into the casing, where the exhaust fan is designed to pull air from both the combustion chamber and the inside of the casing, to ensure a complete combustion and a small likelihood of undesired smell around the toilet. The air-providing channel draws advantageously in air from an area outside the toilet room, in which the toilet is placed, to ensure that there will not be an undesired use of limited indoor air.

SHORT DESCRIPTION OF THE DRAWINGS

The various characteristics and advantages with the invention will now be illustrated in the following detailed description, where the toilet is described with reference to the attached drawings, where.

DETAILED DESCRIPTION

Figure 1:
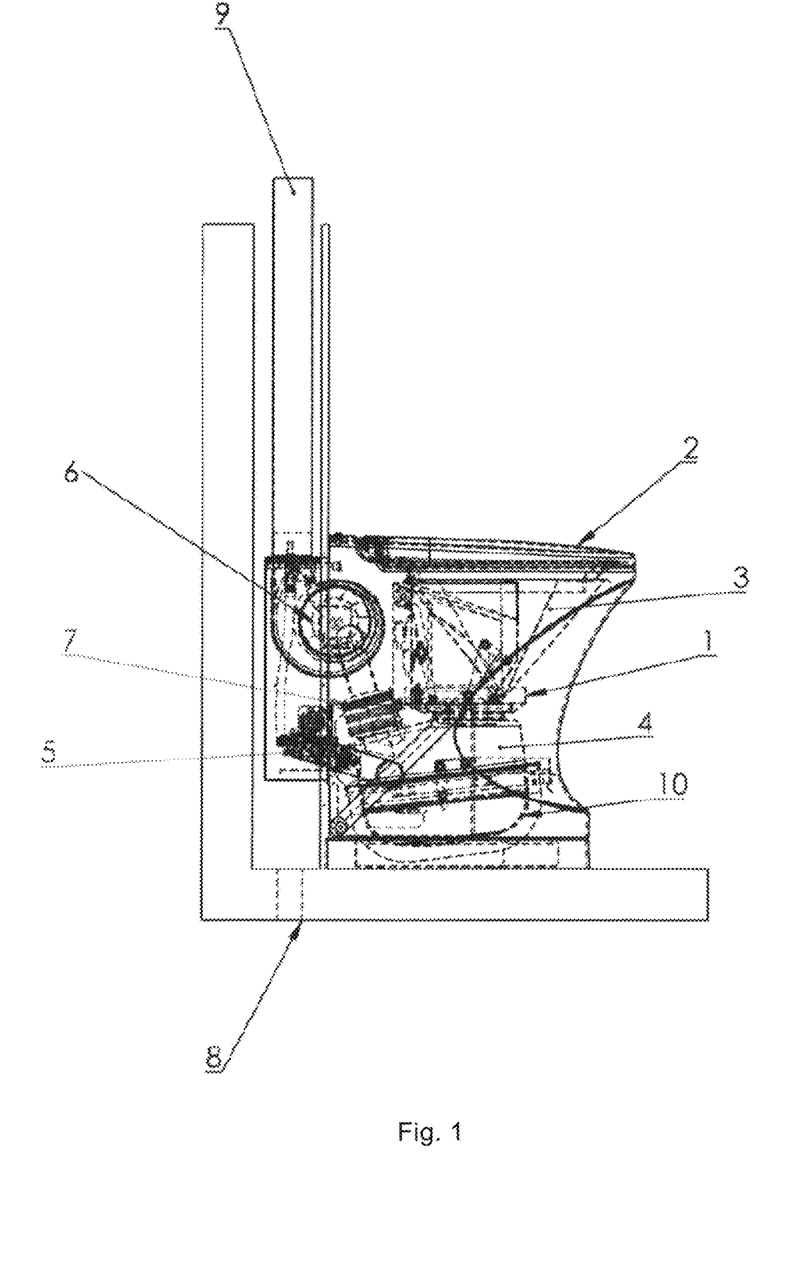
FIG. 1 is an image of the inventive toiled in a side view, mounted in a toilet room, with the inner parts of the toilet shown in broken lines.

FIG. 1 shows the toilet installed in a toilet room, for example in a caravan. The toilet includes a chair with a seating ring and cover 2. Below these, there is a pouch bowl 3 and a combustion chamber 4 below the bowl. Between the pouch bowl 3 and the combustion chamber, there is a hatch mechanism. When being used, it is expected that a waste pouch is arranged in the pouch bowl (manually). When the pouch has received its contents, the hatch mechanism is activated, so that it opens and lets the pouch fall down in the combustion chamber and thereafter it closes again. Subsequently, a gas burner 5 (can be replaced by another suitable heat source, such as an electric heat source or a diesel-powered burner) for combustion of the pouch with waste. The gas burner 5 is provided with a fan for combustion air. At the same time an exhaust fan starts, that sucks out exhaust gases from the combustion chamber 4 through a catalyzer 7.

The toilet does not make use of the same air as the room where it stands. In a closed position, the toilet draw air for combustion and cooling from the outside of the caravan/cottage etc. through a dedicated airduct. I.e the toilet does not consume indoor air for combustion, and will thereby not come in conflict with other consumers of air such as: fan in toilet room, fireplace, ventilating fans etc.

In this model, air is collected through an opening 8 in the floor. Thereafter it is guided into the base/pedestal of the toilet casing 25, where it is gradually heated when it rises inside the casing. The air will then disperse as the fan of the gas burner 5 draws necessary air and sends it through the gas burner. The remaining air will be drawn into the exhaust fan 6, where it is mixed with gases from the catalyzer 7 (through the combustion chamber 4) and sent out through a pipe 9 over the roof.

Each component of the toilet will be described in more details below.

Figure 2:
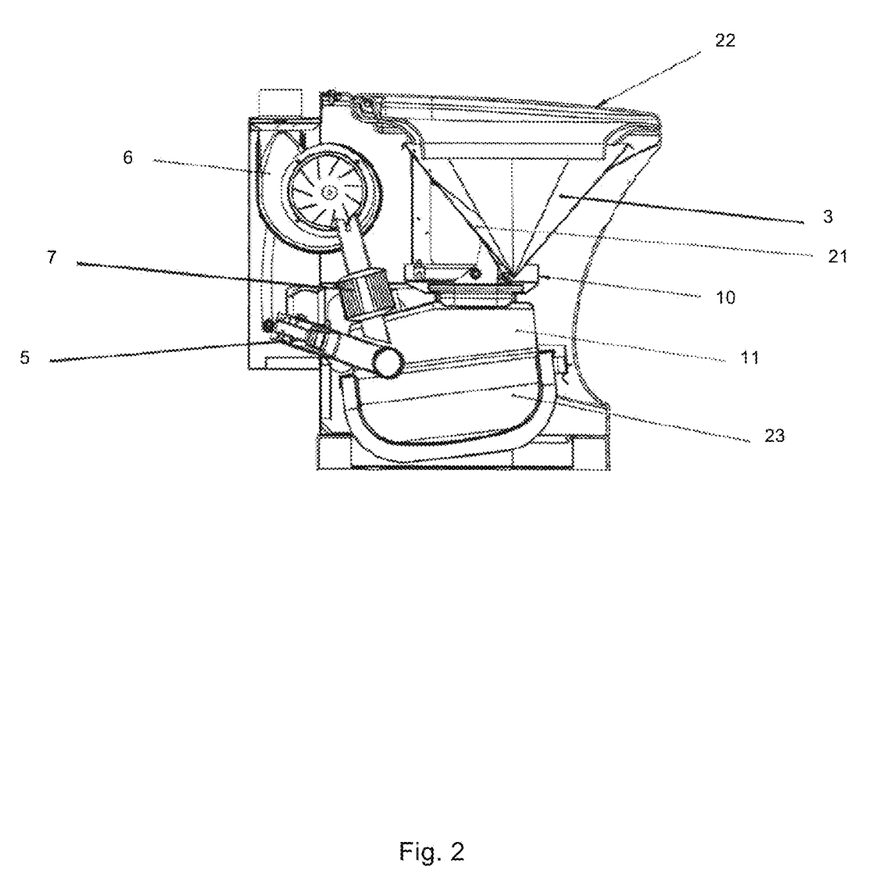
FIG. 2 is a cross sectional side view of the toilet, with the closing mechanism closed.
Figure 3:
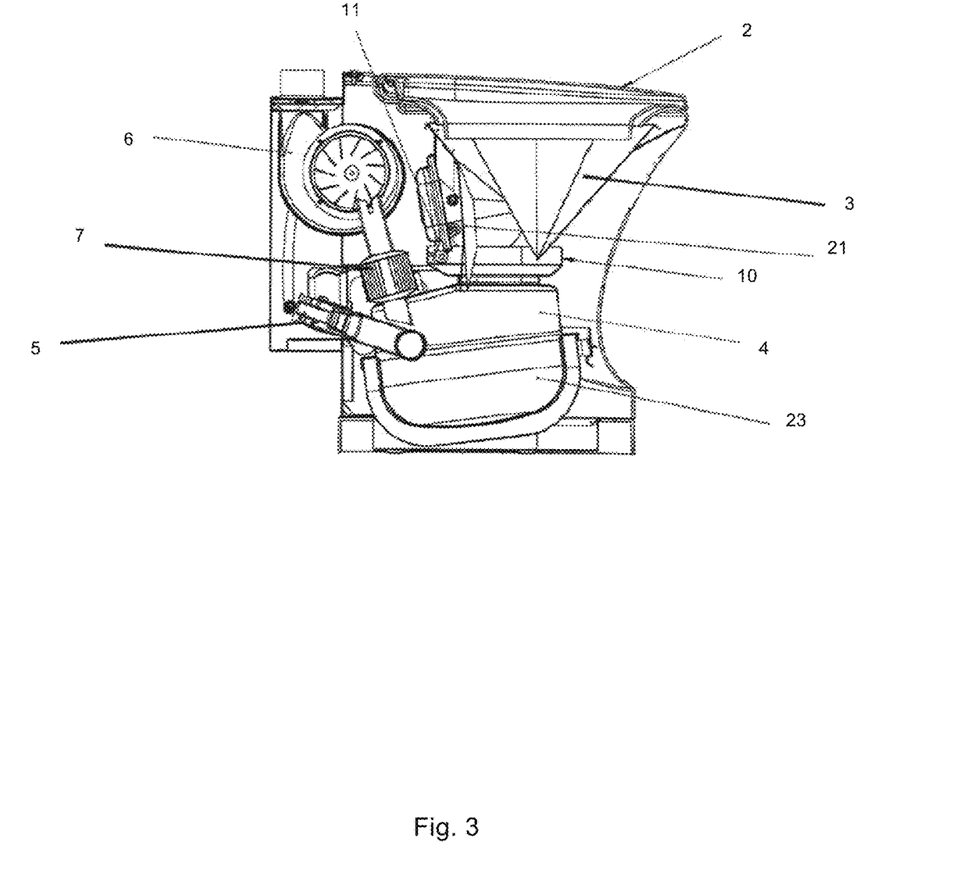
FIG. 3 is a corresponding view, with the hatch open.
Figure 4:
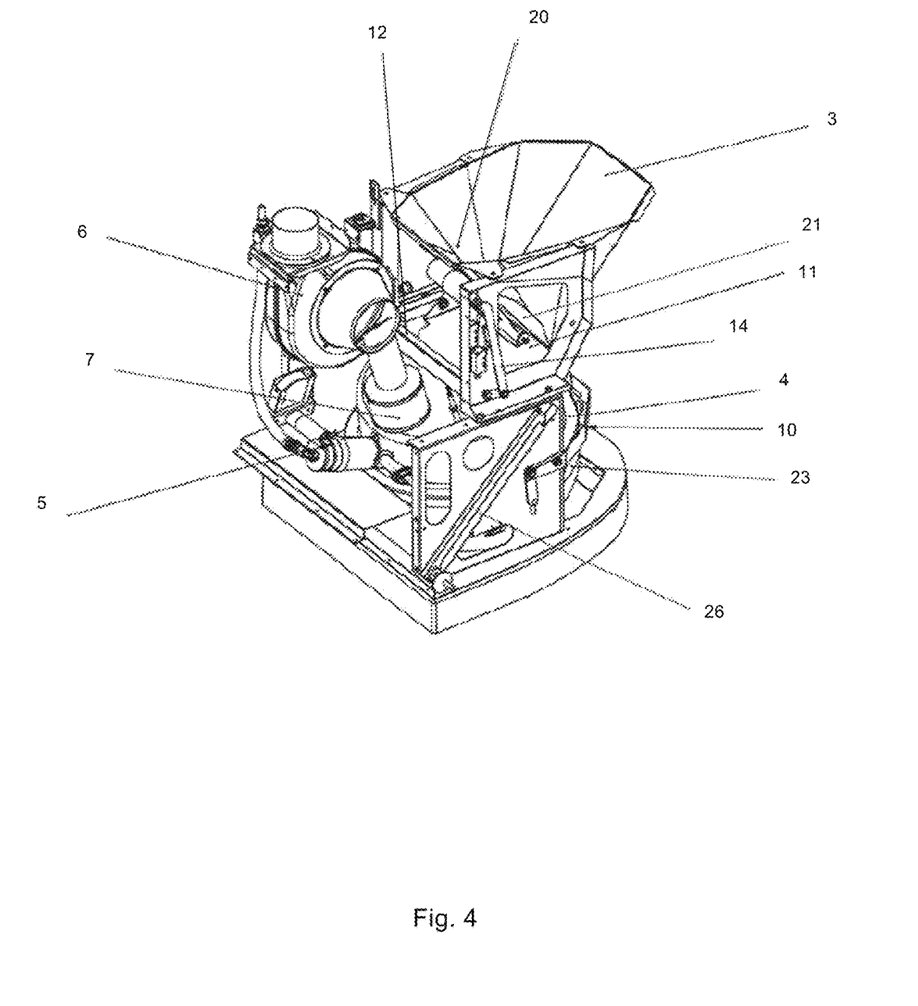
FIG. 4 is a perspective view of the toilet.
Figure 5:
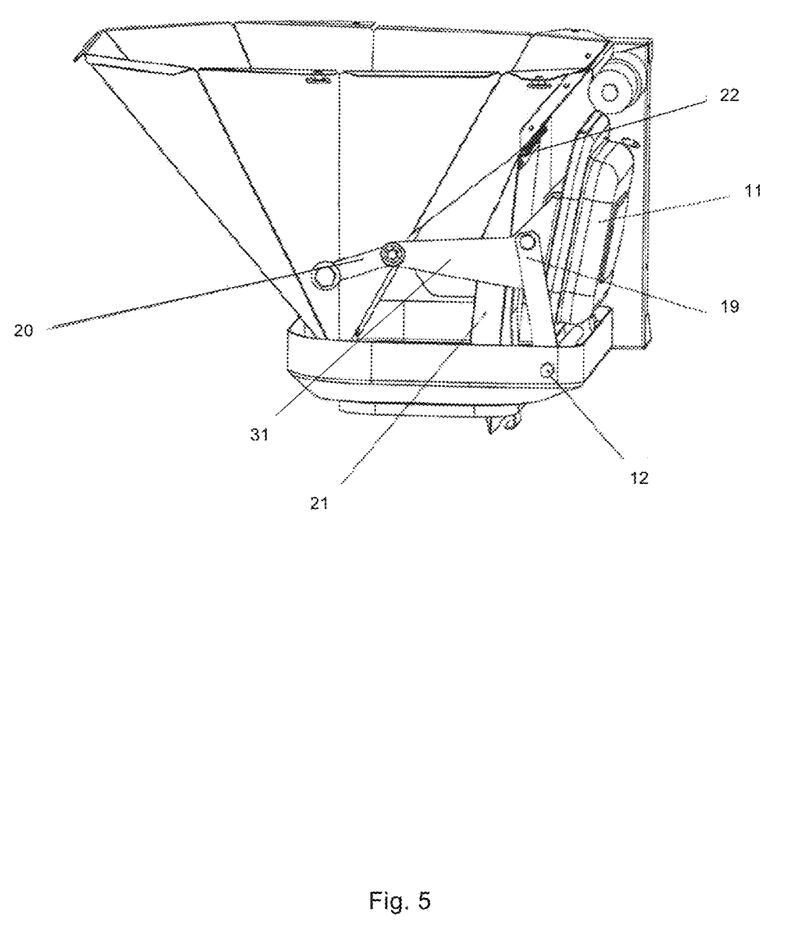
FIG. 5 is a corresponding perspective view showing details of the toilet, with the hatch open.
Figure 6:
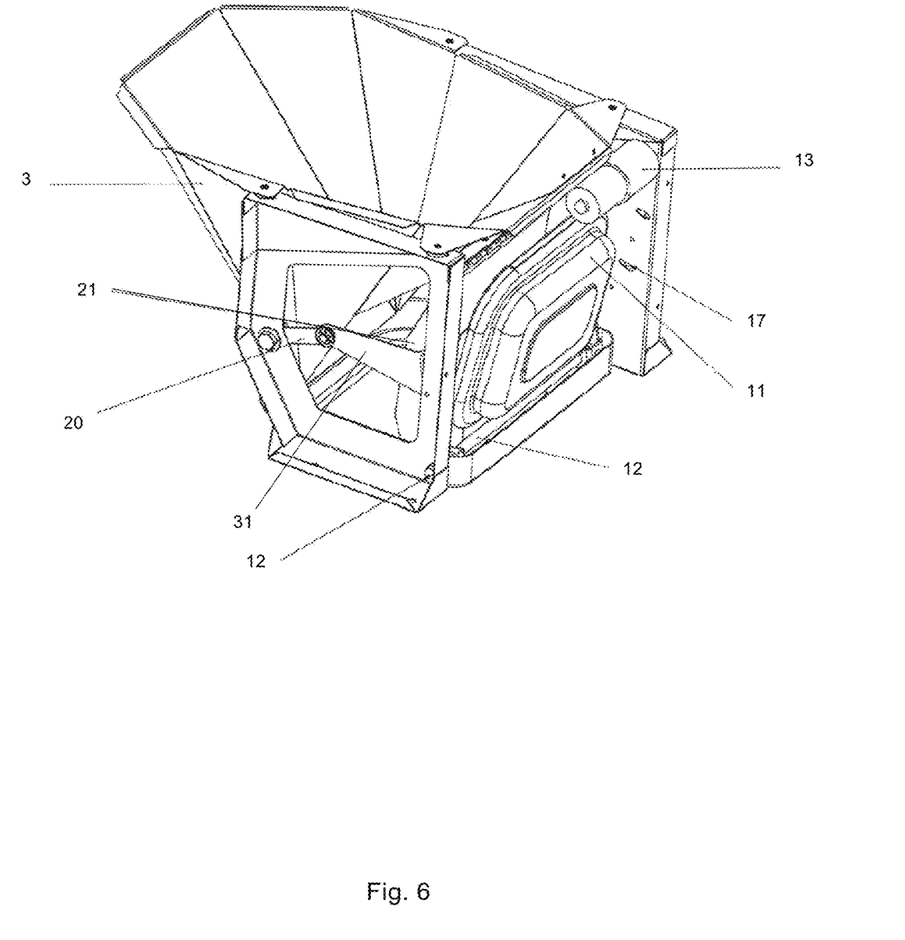
FIG. 6 is a corresponding perspective view, from behind.

The pouch bowl 3 has evenly slanting walls and also a flap 21 closing the bowl 3 in the backside. In this position, the bowl+flap form a shape adapted to the pouch being laid down therein. Under the flat, there is an insulated hatch 11. In other words there is a double safeguarding between the combustion chamber and the pouch bowl. The flap 21 is suspended in a spring-loaded hinge 22, while the hatch is operated by means of an electric motor 13.

The hatch mechanism, or rather the mechanism for discharge of pouch with waste from the pouch bowl 3 down into the combustion chamber 4, comprises a spill tray 10 with elevated sides mounted over the opening of the combustion chamber. The spill tray 10 serves as sealing plane for an insulated hatch 11, and the elevated sides ensures that possible spill does not flow out. At the back side of this, there is mounted a throughgoing shaft 12. An electric motor 13 up on the right framing side runs the shaft 12 via a stay or rod transmission 14, 15. The motor is operated electronically by the mother board of the toilet. Sensors 16, 17 registers the position of the hatch 11.

A fork 19 is coupled to the shaft 12. This is communicating with lugs 31 on the hatch 11. When the shaft 12 is rotated, this fork 19 will lift the hatch upwards and backwards. An auxiliary lever 20 controls the hatch so that it is rotated to a vertical position over the shaft.

Simultaneously with the hatch 11 being rotated upwards, the flap 21 of the pouch bowl 3 will open. The flap rotates around a spring-loaded hinge 22. The curvature of the flap makes the flap remain closed when the hatch is not completely open. Only then, will the flap open, which gives an abrupt opening. This contributes to an efficient discharge of the pouch.

Unlike other incineration toilets, the waste handling parts of this toilet only comprises tilting, rotating or revolving parts and no rail transmissions. To ensure a compact and adequate movement, the combustion cover is lifted directly upwards before it is rotated backwards. When the combustion cover is opened, the flap of the pouch bowl will be activated and the discharge is enhanced by an abrupt movement of the flap. The opening and combustion cover are rectangulary shaped due to save space.

The combustion chamber 4 comprises an inclined ash tray 23 forming the lower part of the chamber. As the ash tray is inclined the following is achieved:

During discharge of a pouch with contents, it will roll backwards and away from the "drop zone". Thereby, there will be more space for the pouch of a following toilet visit.

Reduced sitting height as the ash tray is lowered in the pedestal, and thereby is arranged closest possible to the ground.

The catalyzer system: For the caravan market, it is especially important to pay notice to smell due to the crowdedness. The catalyzer starts working over approx. 350° C., ideal temperature is over 450° C. For obtain a favorable temperature for the catalyzer as soon as possible, it is arranged a "supplemental beam" from the burner, which starts the catalyzer early. The supplemental beam is an extra beam pointing directly towards the catalyzer, in addition to the beam pointing down into the combustion chamber. This, in combination with a suction fan, ensures a negative pressure in the combustion chamber, which renders the conditions for an odorless combustion optimized.

The toilet has an outer jacket including a back and bottom part in steel, and a plastic casing 25 with cover 2 and sitting ring. The plastic casing 25 is formed in one piece, see FIG. 7. For access to the ash tray in the lower part of the toilet, the whole casing is lifted along a rail guidance such as sliding or leading rails 26, and locked in open position. The rail guidance includes two inclined leading rails 26 mounted on the steel frame of the toilet. On each side of the casing 25, in the lower corners being situated close to the back side of the toilet, there is mounted a bolt 28 fitting into these rails 26. See FIG. 8. The rails 26 are constructed with indentations 29 close to the upper end, in which the bolts 28 fall down for locking in open position. Similarly, there is a vertical part on the rails 26 in the lower end. This locks the casing in closed position. To open the casing, it must at first be lifted approx. 10 mm directly upwards before it can slide upwards and forward. A support strap 27 being connected to the toilet frame and to the casing, prevents the casing from rotating outwards or falling down when the bolts are locked in the upper position, i.e. during emptying of ash or other maintenance.

Figure 7:
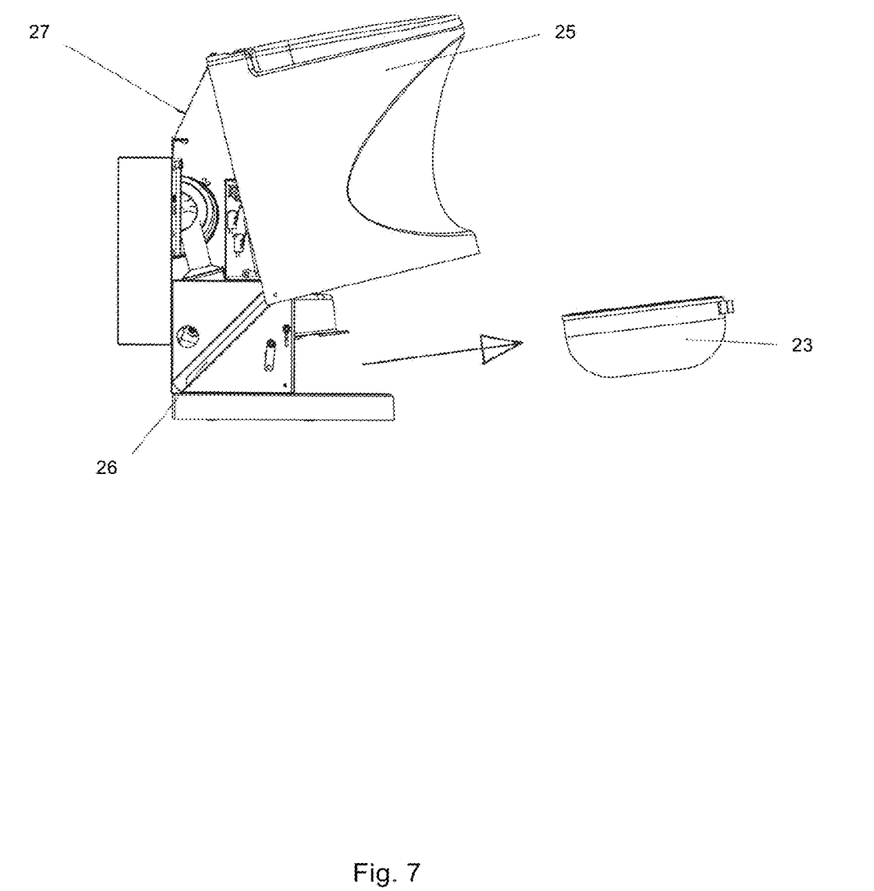
FIG. 7 is a side view of the toilet, with an elevated outer casing.
Figure 8:
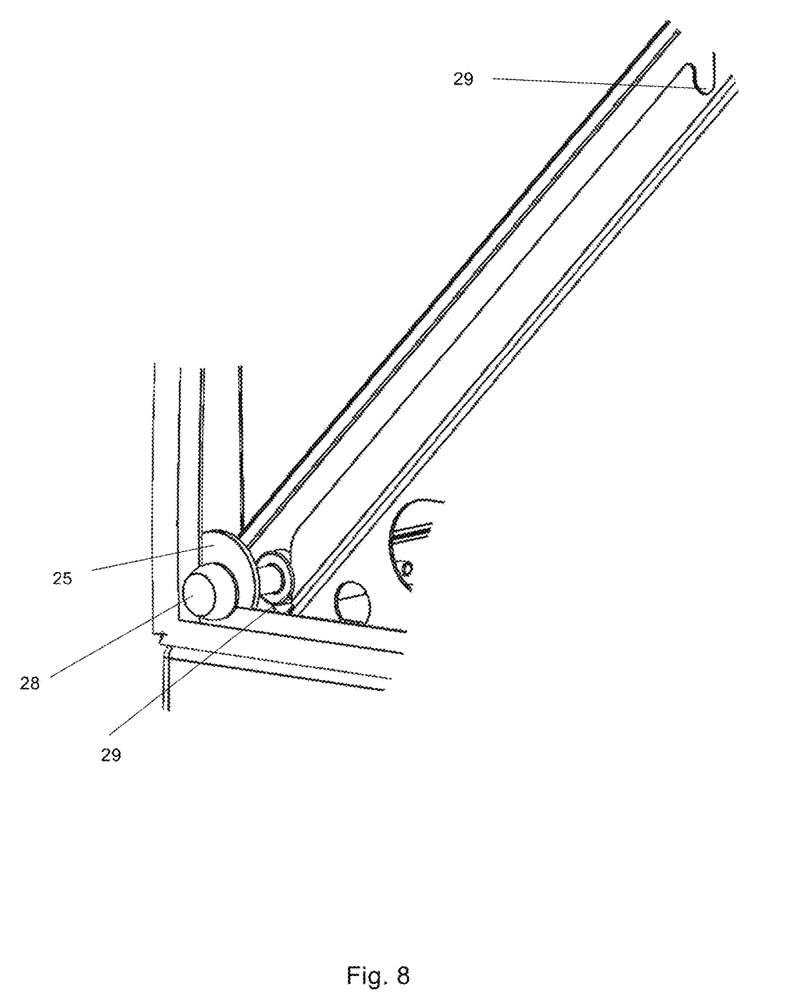
FIG. 8 is a side view of the sliding or leading rail and the bolt.

If access to the upper parts of the toilet is requested for maintenance, the upper support strap is loosened or released. With the casing locked in upper end of the guiding rails, it can now be lowered down and forwards for easy access. It an even better access is requested, locking pins at the end of the guiding rails are removed and the casing is lifted completely away and set aside.

Above, it is described an incineration toilet especially suitable for caravans and camping cars. The toilet comprises a toilet chair with a pouch bowl (3). In the pouch bowl (3), a waste pouch can be arranged. Below the pouch bowl, there is a hatch mechanism over a combustion chamber (4). The hatch mechanism comprises a spring-loaded flap (21) in the back part of the pouch bowl, as well as a hatch (11) abutting an opening in the upper part of the combustion chamber (4). The hatch (11) is coupled to a motor (13) via a stay transmission (14, 15). The motor is arranged to lift the hatch (11) and revolve it up behind the flap (21), so that the flap is released and the pouch can fall down into the combustion chamber (4).

The invention claimed is:

1. An incineration toilet comprising:
a toilet pedestal and an outer toilet casing (25), a toilet frame, a pouch bowl (3) and a waste pouch arranged in the toilet pedestal, the pouch bowl being in communication with a combustion chamber (4) via a hatch mechanism;
the incineration toilet further comprising:
a heat source for supplying heat to the combustion chamber (4) and an exhaust fan (6) for drawing out exhaust gases from the combustion chamber (4);
the hatch mechanism comprising:
  a flap (21) suspended in a spring-loaded hinge (22), the flap forming a part of the pouch bowl (3); and
  a hatch (11) arranged to cover an opening of the combustion chamber (4), whereby the hatch (11) is coupled to and openable by a motor (13), revolvable upwards and behind the flap (21) allowing the waste pouch to fall into the combustion chamber (4);
the outer toilet casing (25) being connected to a pair of sliding rails (26) and being rotatable and slidable upwards and away from the toilet pedestal by means of the sliding rails (26);
the outer toilet casing (25) being suspended in the pair of sliding rails (26), the sliding rails being arranged on opposing sides of the toilet pedestal and being provided with locking means at each end of the sliding rails;
the locking means being formed by indentations in the sliding rails;
wherein the outer toilet casing has an upper rear section, an upper front section, a lower rear section and a lower front section on either side of the outer toilet casing; and
wherein a bolt is arranged in the lower rear section of the outer toilet casing on each side thereof, each bolt being in slidable connection with a respective sliding rail (26), thereby holding the outer toilet casing in an open and tilted position by means of the indentations in the rails.

2. The incineration toilet according to claim 1, further comprising a support strap (27) connected at a first end to one of the upper sections of the toilet frame and at a second end to one of the upper rear sections of the outer toilet casing (25).

3. The incineration toilet according to claim 1, wherein the hatch is suspended in a fork (19), the fork comprising:
at least one arm joined to a shaft (12);
wherein the fork is rotatable around the shaft (12) and coupled to the motor (13) via a transmission (14, 15).

4. The incineration toilet according to claim 1, further comprising an auxiliary lever (20) controlling the movement of the hatch (11).

5. The incineration toilet according to claim 1, further comprising a catalyzer (7) arranged between the combustion chamber (4) and the exhaust fan (6), and wherein the heat source comprises a gas burner (5) arranged to send a main flame of burning gas towards the waste in the combustion chamber (4), and a supplemental flame directed towards the catalyzer (7).

6. The incineration toilet according to claim 1, further comprising an air-providing channel (8) leading into the outer toilet casing (25), and that the exhaust fan is designed to pull air from both the combustion chamber (4) and the inside of the outer toilet casing (25).

7. The incineration toilet according to claim 6, wherein the incineration toilet is located within a first area and the air-providing channel draws in air from a second area external to the first area in which the toilet is located.

8. The incineration toilet according to claim 1, wherein the combustion chamber (4) comprises an ash tray (23) forming a lower base of the combustion chamber (4), and wherein the combined combustion chamber and ash tray is tilted.

9. An incineration toilet comprising:
a toilet pedestal and an outer toilet casing (25), a toilet frame, a pouch bowl (3), and a waste pouch arranged in the toilet pedestal, the pouch bowl being in communication with a combustion chamber (4) via a hatch mechanism;
the incineration toilet further comprising:
a heat source for supplying heat to the combustion chamber (4), and an exhaust fan (6) for drawing out exhaust gases from the combustion chamber (4);
the hatch mechanism comprising:
  a flap (21) suspended in a spring-loaded hinge (22), the flap forming a part of the pouch bowl (3); and
  a hatch (11) arranged to cover an opening of the combustion chamber (4), whereby the hatch (11) is coupled to and openable by a motor (13), revolvable upwards and behind the flap (21) allowing the waste pouch to fall into the combustion chamber (4);
the combustion chamber (4) comprising an ash tray (23) forming a lower base of the combustion chamber (4), wherein the combined combustion chamber and ash tray is tilted;
wherein a bolt arranged in each of the lower rear corners of the outer toilet casing is in slidable connection with the sliding rail (26), the bolt being lockable by means of indentations in the rail, thereby leaving the outer casing (25) in an open and tilted position.

10. The incineration toilet according to claim 9, the outer toilet casing (25) being slidably connected to a pair of sliding rails (26) and being rotatable and slidable upwards and away from the toilet pedestal by means of the pair of sliding rails (26).

11. The incineration toilet according to claim 10, the outer toilet casing (25) being suspended in the pair of sliding rails (26), the pair of sliding rails being arranged on opposing sides of the toilet pedestal and being provided with locking means on at least one end of each of the sliding rails.

12. The incineration toilet according to claim 9, further comprising a support strap (27) connected at a first end to an upper section of the toilet frame and at a second end to an upper rear section of the outer toilet casing (25).

13. The incineration toilet according to claim 9, wherein the hatch is suspended in a fork (19), the fork comprising:

at least one arm joined to a shaft (12);

wherein the fork is rotatable around the shaft (12) and coupled to the motor (13) via a transmission (14, 15).

14. The incineration toilet according to claim 9, further comprising an auxiliary lever (20) controlling the movement of the hatch (11).

15. The incineration toilet according to claim 9, further comprising an air providing channel (8) leading into the outer toilet casing (25), and that the exhaust fan is designed to pull air from both the combustion chamber (4) and the inside of the casing (25).

16. An incineration toilet comprising:

a toilet pedestal and an outer toilet casing (25), a toilet frame, a pouch bowl (3) and a waste pouch arranged in the toilet pedestal, the pouch bowl being in communication with a combustion chamber (4) via a hatch mechanism;

the incineration toilet further comprising:

a heat source for supplying heat to the combustion chamber (4) and an exhaust fan (6) for drawing out exhaust gases from the combustion chamber (4);

the hatch mechanism comprising:
a flap (21) suspended in a spring-loaded hinge (22) the flap forming a part of the pouch bowl (3); and
a hatch (11) arranged to cover an opening of the combustion chamber (4), whereby the hatch (11) is coupled to and openable by a motor (13), revolvable upwards and behind the flap (21) allowing the waste pouch to fall into the combustion chamber (4);

the combustion chamber (4) comprising an ash tray (23) forming a lower base of the combustion chamber (4), wherein the combined combustion chamber and ash tray is tilted;

the incineration toilet further comprising a catalyzer (7) arranged between the combustion chamber (4) and the exhaust fan (6), and wherein the heat source comprises a gas burner (5) arranged to send a main flame of burning gas towards the waste in the combustion chamber (4), and a supplemental flame directed towards the catalyzer (7).

17. The incineration toilet according to claim 15, wherein the incineration toilet is located within a first area and the air providing channel draws in air from a second area external to the first area in which the toilet is located.

* * * * *